Jan. 19, 1932.  J. P. SALMON  1,841,635
METHOD OF RESTORING DRILLS
Filed Aug. 22, 1928
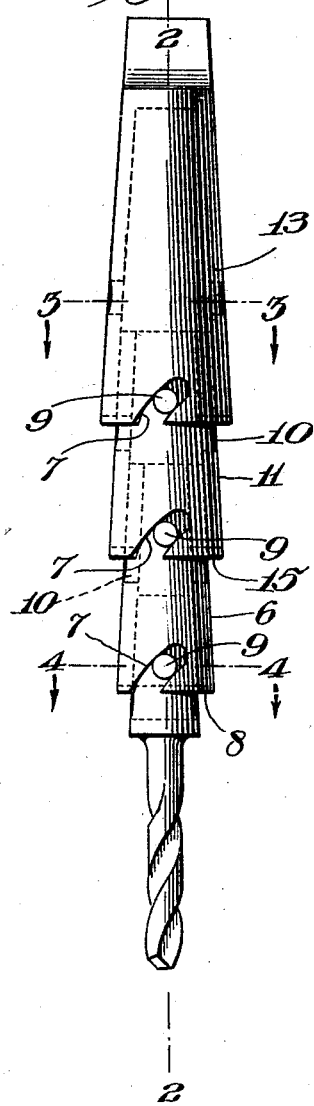
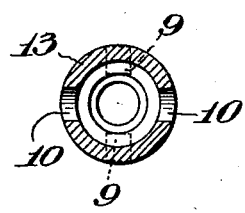
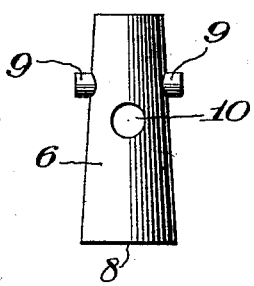
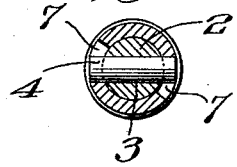
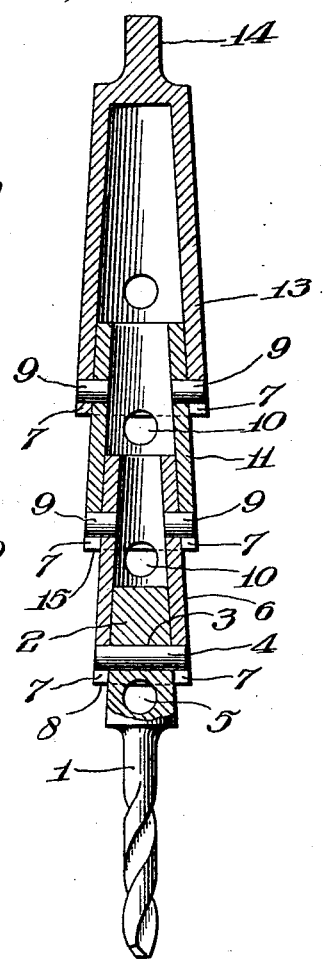
Inventor
James P. Salmon,
By
Attorney.

Patented Jan. 19, 1932

1,841,635

UNITED STATES PATENT OFFICE

JAMES P. SALMON, OF PHILADELPHIA, PENNSYLVANIA

METHOD OF RESTORING DRILLS

Application filed August 22, 1928. Serial No. 301,188.

My invention relates to a new and useful drill socket and it relates more particularly to a novel construction in a drill shank and socket therefor, whereby positive operative engagement may be obtained between a tapered drill shank and a tapered socket.

In the use of the conventional tapered shank drill having a flat terminal tongue, it frequently happens that the flat terminal tongue pulls out of the corresponding flat socket and is thereby worn or twisted off after some time. When the flat terminal tongue of a tapered shank drill is worn or twisted off, the drill can no longer be firmly secured in the conventional tapered shank socket or sleeve and the drill becomes practically worthless since it is impracticable to forge or weld a new tapered shank onto the drill.

My present invention contemplates, among others, the salvaging of tapered shank drills on which the flat terminal tongue has been worn or twisted off from use, although my invention may be embodied equally well in new drills originally provided with my novel construction.

Thus, according to my invention I may cut off the flat terminal portion of a tapered drill shank, thereby producing a relatively short shank and then provide a pair of opposed lugs, projections or pins thereon and a corresponding tapered socket or sleeve having a pair of properly inclined slots for engagement with said pins, thereby effecting operative engagement between the relatively short tapered drill shank and tapered drill socket or sleeve.

In order to accommodate various sizes of drills, a successive series or nest of such drill sockets or sleeves may be provided, each provided with opposed lugs or pins and corresponding inclined slots.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings in which like reference characters indicate like parts, Figure 1 represents a view in elevation of the drill or drill sockets and sleeves embodying my invention.

Figure 2 represents a section on line 2—2 of Figure 1.

Figure 3 represents a section on line 3—3 of Figure 1.

Figure 4 represents a section on line 4—4 of Figure 1.

Figure 5 represents a side elevation of one of the series of drill sockets or sleeves detached.

The drill 1 may be any conventional tapered shank drill having a tapered shank portion 2 with the flat terminal tongue thereof removed and thereby correspondingly shortened. The drill 1 and shank 2 may, however, be a drill and shank specially constructed with any suitable taper. At a suitable point an aperture 3 is provided through the tapered shank portion 2, through which a pin or bar 4 is extended with a drift fit. The pin or bar 4 may be any suitable material, preferably steel, to withstand the strain. A second aperture 5 is also provided through the shank at a point a suitable distance below the pin 4, and preferably at a right angle thereof, for the reception of a suitable drift pin, whereby the drill may be separated from or removed from the drill socket or sleeve.

The drill socket or sleeve 6 is of suitable tapered tubular construction as shown particularly in Figure 2 and is provided with a pair of similar inclined slots 7 adapted to receive and engage the ends of the pin 4 of the drill.

The lower edge 8 of the sleeve 6 is slightly below the upper edge of the drift hole 5 in the drill shank 2, so that a suitable drift pin forced into the hole 5 will engage the lower edge 8 of the socket 6, thereby separating the same from the drill shank.

The sleeve 6 in turn is provided with a pair of similar and opposed pins or projections 9 immediately above and disposed at a right angle to a suitable drift hole 10 in said sleeve. Each successive sleeve such as the sleeve 11 is similarly provided with inclined slots 7, a drift hole 10 and pins 9 as shown particularly in Figures 1 and 2.

In order to mount the drill sockets or sleeves 6 and 11 in the conventional drill press spindle having the conventional taper socket and flat tongue socket, a terminal socket or sleeve 13 may be provided also having the pair of opposed inclined slots 7 to engage the pins 9 of the last tapered drill socket 11 but having a flat terminal tongue 14 adapted to fit into the corresponding flat terminal socket portion of the conventional drill press spindle.

The slots 7 are preferably short and at an incline of approximately forty-five degrees so as to draw the drill shank or the preceding drill socket or sleeve into the tapered opening and so as to permit the ready separation of drill from socket or socket from socket with the aid of a drift pin. Thus the angle of the slot 7 is such as not to lock or jam the drill in the socket or one socket in another socket.

It will also be observed that by the novel provision of drift holes 5 and 10, disposed immediately beneath the lower terminal edges 8 and 15 of the sockets 6, 11 and 13, any two of a series of nested sockets may be separated without separating each of the sockets in succession, as is necessary in the conventional forms or sleeves or sockets heretofore in use.

By my invention it is not only possible to utilize drills which would otherwise be worthless, but a more firm and more easily detachable connection is obtainable between drill and driving member than by the constructions employed heretofore.

While in the drawings I have shown an embodiment of my invention employing a pair of opposed coupling slots and corresponding lugs, yet it is to be understood that the number of slots and lugs employed may be varied. Thus it is possible to use but a single slot and lug or more than two.

One of the advantages of my novel construction is that when the drill pierces or passes through the metal the bayonet slots, due to their peculiar angularity, will retain the drill against any downward pull caused by the sudden engagement of the twist of the drill with the last bit of metal to be cut out or drilled. Thus my novel construction eliminates the difficulty frequently experienced in employing the ordinary taper shank drill and drill socket.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. The method of restoring to usefulness tapered-shank drills whose flat terminal tongue portions have been mutilated, which consists in drilling a hole through the tapered-shank portion of the drill at substantially a right angle to the axis of the drill, driving a pin of suitable length into said hole, so that its two ends project beyond the same, providing a tapered sleeve for receiving the tapered shank of the drill, and cutting a pair of opposed inclined slots into the large end of the tapered sleeve, corresponding to the projecting ends of the pin, and at an angle as to permit the separation of the sleeve from the drill by axial force and as to cause the drill to be drawn into the sleeve with suitable force, by the torque incident to drilling with the drill.

2. The method of restoring to usefulness tapered-shank drills whose flat terminal tongue portions have been mutilated, which consists in drilling a hole through the tapered-shank portion of the drill at substantially a right angle to the axis of the drill, driving a pin of suitable length into said hole, so that its two ends project beyond the same, providing a tapered sleeve for receiving the tapered shank of the drill, cutting a pair of opposed inclined slots into the large end of the tapered sleeve, corresponding to the projecting ends of the pin, and at an angle as to permit the separation of the sleeve from the drill by axial force and as to cause the drill to be drawn into the sleeve with suitable force, by the torque incident to drilling with the drill, and cutting a hole transversely through the tapered shank of the drill in operative alignment with the corresponding end of the tapered sleeve, for temporarily receiving a drift pin for the separation of the sleeve from the drill shank by engagement with the terminal edge of said sleeve.

3. The method of restoring to usefulness tapered-shank drills whose flat terminal tongue portions have been mutilated, which consists in affixing a pin to the tapered-shank portion of the drill in a manner to project therefrom, providing a tapered sleeve for receiving the tapered shank of the drill, and cutting an inclined slot into the large end of the tapered sleeve, corresponding to the projecting pin, and at an angle as to permit the separation of the sleeve from the drill by axial force and as to cause the drill to be drawn into the sleeve with suitable force, by the torque incident to drilling with the drill.

4. The method of restoring to usefulness tapered-shank drills whose flat terminal tongue portions have been mutilated, which consists in affixing a pin to the tapered shank portion of the drill in a manner to project therefrom, providing a tapered sleeve for receiving the tapered shank of the drill, cutting an inclined slot into the large end of the tapered sleeve, corresponding to the projecting pin, and at an angle as to permit the separation of the sleeve from the drill by axial force and as to cause the drill to be drawn into the sleeve with suitable force, by the torque incident to drilling with the drill, and cutting a hole transversely through the tapered shank of the drill in operative alignment with the corresponding end of the tapered sleeve, for temporarily receiving a drift pin for the separation of the sleeve from the drill shank by engagement with the terminal edge of said sleeve.

In testimony whereof, I have hereunto set my hand and seal.

JAMES P. SALMON.